(12) United States Patent
Lindell et al.

(10) Patent No.: US 10,387,634 B1
(45) Date of Patent: Aug. 20, 2019

(54) SYSTEM AND METHOD FOR AUTHENTICATING A PERSON USING BIOMETRIC DATA

(71) Applicants: Unbound Tech Ltd, Petah Tiqva (IL); Bar-Ilan University, Ramat Gan (IL)

(72) Inventors: Yehuda Lindell, Givat Shmuel (IL); Guy Pe'er, Talmey Yechiel (IL)

(73) Assignees: UNBOUND TECH LTD., Petah Tiqva (IL); BAR-ILAN UNIVERSITY, Ramat Gan (IL)

( * ) Notice: Subject to any disclaimer, the term of this patent is extended or adjusted under 35 U.S.C. 154(b) by 0 days.

(21) Appl. No.: 15/979,822

(22) Filed: May 15, 2018

(51) Int. Cl.
*G06F 21/32* (2013.01)
*G06F 21/35* (2013.01)
*H04L 9/32* (2006.01)

(52) U.S. Cl.
CPC .............. *G06F 21/32* (2013.01); *G06F 21/35* (2013.01); *H04L 9/3228* (2013.01); *H04L 9/3231* (2013.01); *H04L 2209/46* (2013.01)

(58) Field of Classification Search
CPC ....... G06F 21/32; G06F 21/35; H04L 9/3228; H04L 9/3231
USPC ........................................................ 713/186
See application file for complete search history.

(56) References Cited

U.S. PATENT DOCUMENTS

| 9,111,126 | B2 * | 8/2015 | Carper | ............... G06Q 20/1085 |
| 2012/0166810 | A1 * | 6/2012 | Tao | ......................... G06F 21/32 |
| | | | | 713/186 |
| 2016/0294550 | A1 * | 10/2016 | French | ..................... H04L 9/00 |

* cited by examiner

*Primary Examiner* — Thanhnga B Truong
(74) *Attorney, Agent, or Firm* — Alphapatent Associates, Ltd; Daniel J. Swirsky

(57) ABSTRACT

The subject matter discloses a computerized system for authenticating a person requesting access to a physical entity. The system comprises a controller configured to control access to the physical entity, said controller is connected to a biometric acquisition device configured to acquire biometric data of the person. The controller comprises a communication module configured to communicate wirelessly with an electronic device used by the person. The system also comprises a computerized server communicating with the controller or the person's electronic device, said server is configured to provide validation indication of the person using the biometric data and an MPC process performed between at least two of the controller, server and the person's device.

6 Claims, 5 Drawing Sheets

SYSTEM AND METHOD FOR AUTHENTICATING A PERSON USING BIOMETRIC DATA

FIELD OF THE INVENTION

The present invention is generally related to authentication, more specifically to authenticating a person using biometric data.

BACKGROUND OF THE INVENTION

Biometric authentication is gaining popularity around the world, and is used by users for multiple purposes, such as to unlock their phones, login to their laptops and more. The users' biometric information, for example the user's image, is stored in the device unlocked or on a server communicating with the device, and the captured image of the user is compared with the stored image. Biometric authentication can also be used to access physical locations, such as gates or doors, when a camera is located near the gate, captures the user's image, and a processor communicating with the camera compares the captured image with an image stored in a memory device.

This process incurs privacy concerns of storing the biometric sample on a centralized server or even in a specific device, as this biometric data can be stolen or used by malicious software operating on the user's device. Further, this process also incurs privacy concerns related to the process of sending the biometric sample taken for authentication to any other device. There is a technical need to provide biometric authentication without compromising this information while maintaining high usability for the user.

SUMMARY OF THE INVENTION

The present invention discloses a system and method for authenticating a person. The person may be authenticated when requesting access to a physical location, for example via a gate, when requesting to perform payment using an account associated with an electronic device such as the user's telephone, laptop or tablet computer, entering a location to which payment was already made (such as public transportation, a sports event and the like) and the like. The method discloses acquiring biometric data of the user using a biometric data acquisition device located on a physical device communicating with the user's electronic device, for example via Bluetooth, performing an MPC process between the user's device and the physical device to determine a match between the biometric data acquired by the physical device and information stored in the user's device without revealing the samples. The biometric data may be the person's image, fingerprints, eyeballs and the like. The biometric data acquisition device may be a camera, a scanner or any device desired by a person skilled in the art. For simplicity, the description uses camera as an example of the biometric data acquisition device. The method also comprises performing an authentication process between the user's device and the server. The server communicates with the gate. In case the authentication process is successful the server sends an indication to the gate. In case both the authentication process and the MPC process are successful, the gate opens.

The system and method of the disclosed subject matter enable the user to be authenticated without holding their mobile electronic device, keeping the entire process transparent. Further, access to the physical entity is not provided to a person who is unauthorized without stealing the user's private key. The user's private key cannot be used to authenticate someone else since the camera captures an image of the person located near the physical entity, such as a door, and there will not be a match with the biometric sample stored in the device. Compromising the device alone cannot spoof a match since the MPC process used to determine the match is secure against malicious adversaries.

It is not possible to setup a device near the door that will record the face of everyone who comes to the door because MPC is used to check the match and the captured image is not sent to the user's electronic device. Further, it is also not possible to steal the biometric sample from the user's electronic device since the biometric sample is also not sent to the in its entirety to the controller. The server does not hold any Biometric information so it cannot be stolen, to satisfy privacy regulations.

It is an object of the subject matter to disclose a computerized system for authenticating a person, comprising a controller configured to control access to a physical entity, said controller is connected to a biometric acquisition device configured to acquire biometric data of the person near the physical entity, said controller comprising, a communication module configured to communicate wirelessly with an electronic device used by the person, a computerized server comprises a secret storage configured to store secrets of multiple devices, a communication module configured to exchange information with at least one of the controller or the electronic device used by the person and a processing module communicating with the controller, said server is configured to provide validation indication of the person, at least one of the controller and the computerized server comprises a multi-party computation module configured to perform an MPC process with an MPC module located in the electronic device used by the person to determine a match between the person's biometric data acquired by the biometric acquisition device and at least a portion of a biometric sample stored in the electronic device used by the person, wherein the controller determines authentication of the person upon determination of the match and receipt of the validation indication that the secret stored at the secret storage and associated with the electronic device used by the person matches the information stored in the electronic device.

In some cases, the server comprises a processing module configured to determine authenticity of the electronic device used by the person according to the secret stored in the secret storage and the information received from the electronic device used by the person. In some cases, the secret is selected from a group consisting of a symmetric key, a password, a one-time password scheme and a combination thereof. In some cases, the secret stored in the secret storage is compared with a second secret, a first share of the second secret is stored in the electronic device used by the person and a second share of the second secret is stored in a second server.

In some cases, the physical entity is a closed area. In some cases, the physical entity is a computerized device communicating with the controller.

In some cases, the controller is configured to transfer the information from the electronic device used by the person to the server. In some cases, the controller receives the captured image when the person requests access to the physical entity, and wherein the output of the authentication is unlocking the physical entity for access by the person. In some cases, the controller is coupled to the physical entity, wherein the controller allows access of the person to the physical entity upon positive authentication of the person. In some cases, the controller receives the captured image after the person accesses the physical entity and transmits an alert to a remote device in case the authentication failed.

It is another object of the subject matter to disclose a computerized system for authenticating a person, comprising a controller configured to control access to a physical entity, said controller is connected to a biometric acquisition device configured to acquire biometric data of the person near the physical entity, said controller comprising a communication module configured to communicate wirelessly with an electronic device used by the person and an MPC module configured to participate in a multi-party computation (MPC) process with the electronic device used by the person, a computerized server comprises a biometric data storage configured to store shares of biometric samples associated with multiple devices, a communication module configured to exchange information with at least one of the controller or the electronic device used by the person and an MPC module, said server is configured to provide validation indication of the person, wherein the electronic device used by the person stores a share of the person's biometric sample, such that the person's biometric sample cannot be extracted from the information stored at the electronic device used by the person, wherein the controller, the electronic device used by the person and the computerized server perform an MPC process determine a match between the person's biometric data acquired by the biometric acquisition device and the biometric samples stored at the computerized server and the electronic device used by the person, wherein the controller determines authentication of the person upon determination of the match.

It is an object of the subject matter to disclose a method, comprising performing an MPC process between a controller obtaining a biometric data of a person, said biometric data is acquired when the person is located near a physical entity controlled by the controller, said MPC process comprises exchanging information between the controller and an electronic device used by the person to find a match between the acquired biometric data and a biometric sample stored in the electronic device used by the person, receiving validation information from a server communicating with the controller, authenticating the person according to the MPC process and the validation information.

In some cases, the method further comprises exchanging information between the server and the electronic device used by the person and comparing the information received from the electronic device used by the person to a secret stored in the server, wherein the validation information comprises confirmation of a match between the information received from the electronic device used by the person and the secret stored in the server.

In some cases, the method further comprises performing a second MPC process between the server and the controller, wherein the server stores at least a portion of the biometric sample, wherein the validation information comprises confirmation of a match of the second MPC process.

In some cases, the method further comprises allowing the person to access the physical entity. In some cases, the method further generating an alert signal in case authentication failed and transmitting the alert signal to a remote location, said alert signal comprises the captured image.

BRIEF DESCRIPTION OF THE FIGURES

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention discloses a computerized system and method for allowing or denying access of a person to an entity, either a physical entity or a computerized entity. The system comprises three modules, the first module is located on a user's electronic device, the second module is located on an intermediate device configured to guard the entity to which the person wishes to access, and the third module resides on a computerized server communicating with the intermediate device. At least two of the three modules comprise a secure multiparty computation (MPC) module, configured to perform an MPC process, for example between the user's device and the intermediate device. The user's electronic device further comprises an image capturing device, such as a camera, to capture an image of the person when requesting access to the entity. The captured image is compared with data representing a biometric sample of the user, said sample is stored in the user's electronic device. The biometric sample may comprise face recognition, fingerprints and any other property desired by a person skilled in the art. Determining a match between the sample and the captured image is performed using an MPC process, to preserve privacy of the information stored in the user's device. The method may also comprise performing an authentication process between the server and the user's device, and enabling access only in case both match of the biometric data and a successful authentication process. In some other cases, the server is involved in the MPC process of the biometric data, as elaborated below, and match of the MPC process with the server, user's device and the intermediate device results in allowing the user to access the requested entity. The server is configured to send validation information to the controller, validating the person's authenticity in addition to the match outputted from the MPC process between the user's biometric sample and the captured image. In some cases, the validation information is outputted after performing an authentication process 135 of FIG. 1. In some other cases, the server stores a share of the biometric sample and takes part in the MPC process with the captured image. Thus, match in the MPC process with the server also functions as validation information used by the controller to determine the person's authenticity.

Figure 1:
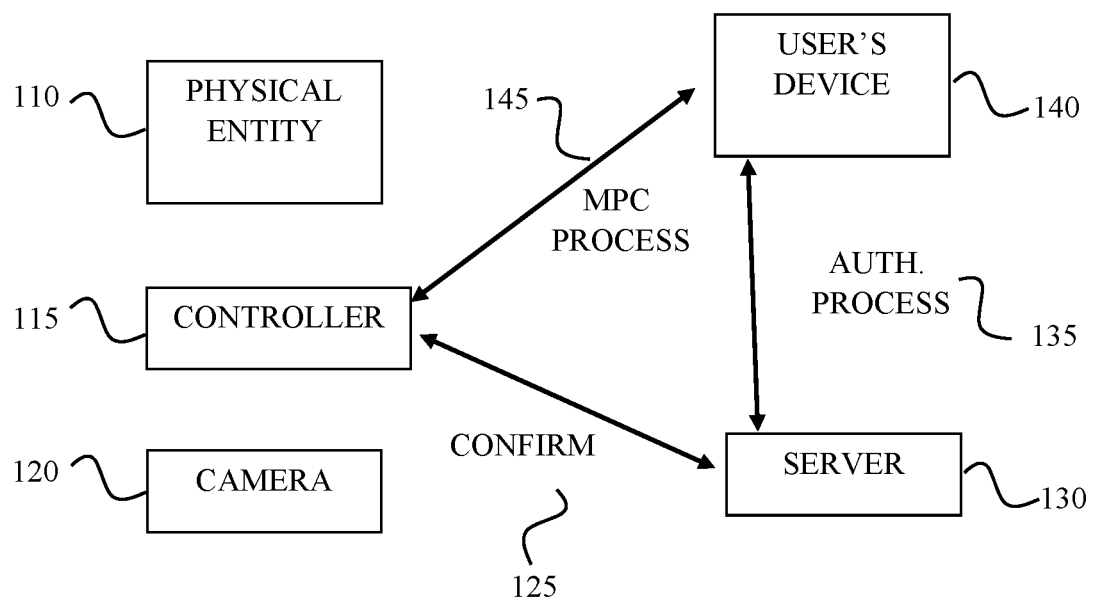
FIG. 1 shows a computerized system for authenticating a person at a physical entity by storing the entire biometric sample in a single device, according to exemplary embodiments of the present invention.

FIG. 1 shows a computerized system for authenticating a person at a physical entity by storing the entire biometric sample in a single device, according to exemplary embodiments of the present invention. The physical entity may be a closed area having a gate, for example a room, building, a yard, park, greenhouse, public transportation vehicle and the like. The physical entity may be a computerized device, for example a computer, and a physical device having communication capabilities such as an IoT device, and the like. The system may be configured to allow access to the physical entity, or to report unauthorized access to the physical entity, depending on multiple use cases elaborated below.

The computerized system comprises a controller 115 located near the physical entity 110. In some cases, the controller 115 may be embedded in the physical entity 110, for example be a module of a computer the person request access to, or be physically secured to a door or gate of the closed area defined above. The controller 115 is electrically coupled to an image capturing device 120 located near the physical entity 110, for example above a door of the closed area or adjacent to a screen of a computer the person requests access to. The image capturing device 120 may be a still camera or a video camera. The camera 120 may operate in response to a request to access the physical entity 110, or when identifying a person near the physical entity 110, or in a periodic manner, for example 10 times per second. The controller 115 has access to the captured images, for example the camera 120 sends the captured images to the controller 115 via a communication channel, either via a cable or via a wireless protocol.

The controller 115 is configured to communicate with an electronic device used by the person to be authenticated when located near the physical entity 110. The person may be authenticated when requesting access to the physical entity 110, or when entering the physical entity. For example, authentication of the person or failure to authenticate the person may be performed after the person entered the closed area, for example after the person entered a public transportation vehicle. The controller comprises a communication module configured to exchange signals with the user's electronic device 140. Such signals may be wireless signals, for example via blue-tooth or Wi-Fi. In some cases, the person may connect the mobile electronic device 140 to an apparatus which extracts the biometric sample stored in the mobile electronic device 140 and sends the biometric sample to the controller 115.

The controller 115 comprises a multi-party computation (MPC) module configured to perform an MPC process 145 to determine whether or not the image captured by the camera 120 matches a biometric sample stored in the user's electronic device 140. The MPC process 145 between the controller 115 and the user's electronic device 140 enable authenticating the biometric data without the user sending the biometric sample to the controller or any other device, and without the controller sending the image captured by the camera to the user's electronic device 140 or any other device. The MPC process 145 comprises the controller 115 and the user's electronic device 140 exchanging information without enabling the other party to reconstruct or hold the entire biometric sample or captured image at any stage of the MPC process 145.

The controller 115 further communicates with a server 130. The server 130 may reside on a remote device, for example on the internet. The controller 115 may further comprise an internet gateway configured to enable communication with the server 130. The server 130 comprises a communication module configured to communicate with at least one of the controller 115 or the user's electronic device 140. In some exemplary cases, the controller 115 is configured to function as an intermediate entity configured to relay signals between the server 130 and the user's electronic device 140.

The server 130 further comprises a secret storage configured to store secrets associated with multiple devices that use the server 130 to authenticate the users of the multiple users when located near physical entities. In some exemplary embodiments, the server 130 and the user's electronic device 140 perform an authentication process 135 in which the server 130 compares a secret stored in the user's electronic device 140 to a secret stored in a secret storage of the server 130. The secret is associated with the specific user's electronic device 140. The secret may be a private key stored at the user's electronic device 140 and matches a public key stored in the server 130. Other implementations of the secret may comprise any type of cryptographic method for authentication, for example using a symmetric key, a password, a one-time password scheme and the like. In some exemplary embodiments, the secret is not stored in its entirety in the user's electronic device 140, but a first share of the secret is stored in the user's electronic device 140 and a second share of the secret is stored in a secondary server distinct from the server 130. In case the MPC process 145 is successful, the secret is reconstructed by performing a secret MPC process between the user's electronic device 140 and the secondary server and sending the output of the secret MPC process to the server 130 to perform the authentication process 135.

In case the authentication process 135 succeeds, the server 130 sends a confirmation 125 to the controller 115. In case both the MPC process 145 and the authentication process 135 succeed, the controller 115 determines that the person is authenticated.

Figure 2:
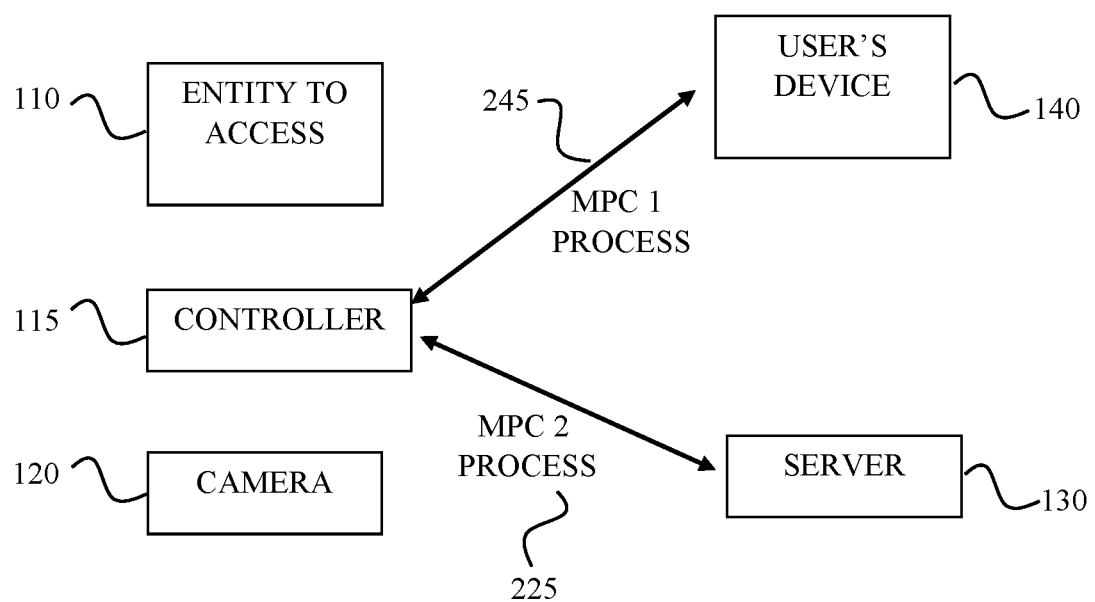
FIG. 2 shows a computerized system for authenticating a person at a physical entity by storing the entire biometric sample in multiple devices, according to exemplary embodiments of the present invention.

FIG. 2 shows a computerized system for authenticating a person at a physical entity by storing the entire biometric sample in multiple devices, according to exemplary embodiments of the present invention. The computerized system comprises the camera 120, controller 115, physical entity 110, server 130 and user's electronic device 140 as disclosed in FIG. 1. The main difference disclosed in the embodiment of FIG. 2 is that the biometric sample is divided between the server 130 and user's electronic device 140, to prevent malicious use of the biometric sample. This way, authentication of the person requires an MPC process to involve the controller 115, the server 130 and user's electronic device 140, as the captured image used by the controller is compared to both the first share of the biometric sample as stored in the user's electronic device 140 and the second share of the biometric sample as stored in the server 130. Authentication of the person is determined after completing first MPC process 245 between the user's electronic device 140 and the controller 115, and second MPC process 225 between the server 130 and the controller 115.

Figure 3:
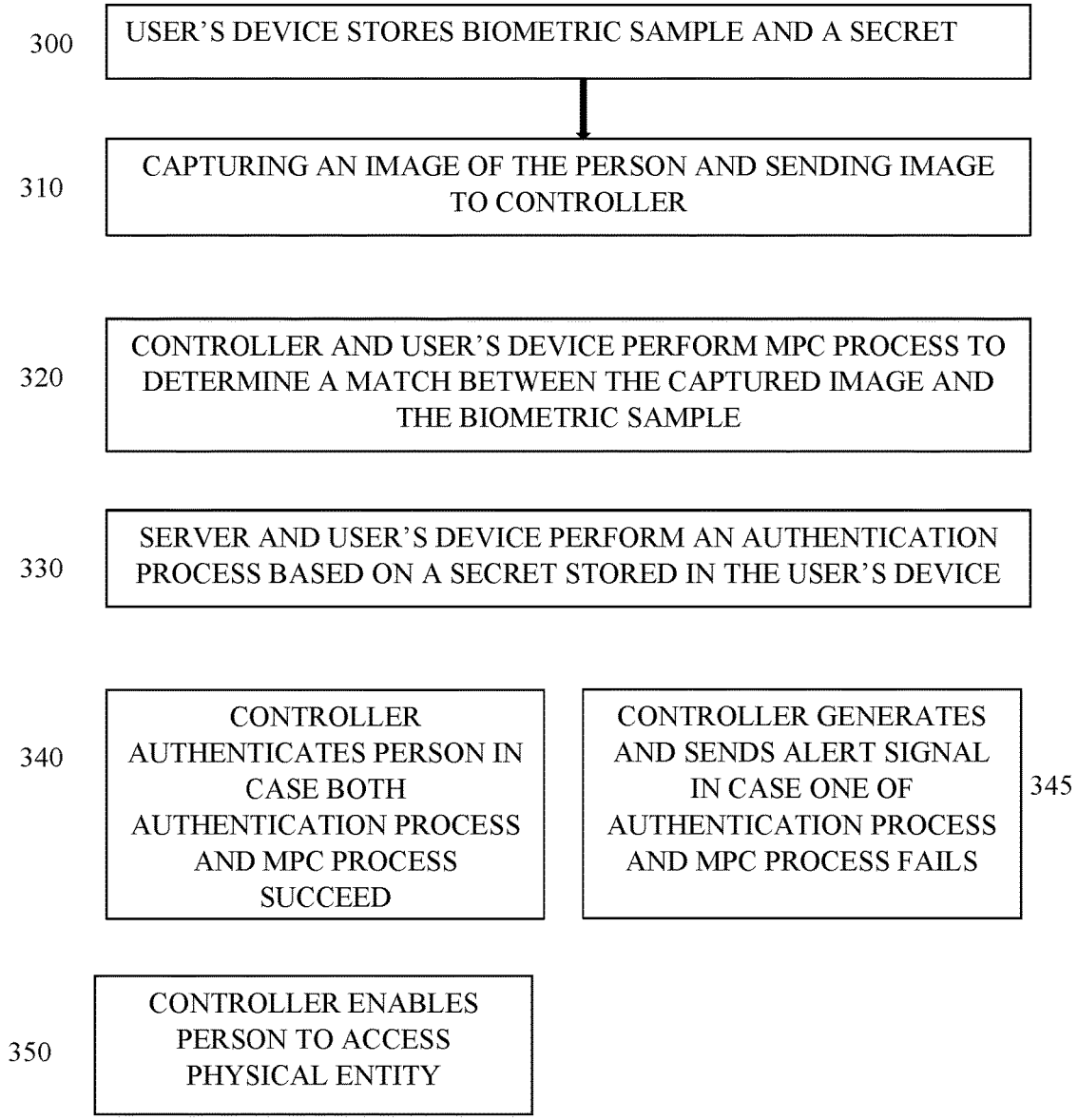
FIG. 3 shows a computerized method for authenticating a person at a physical entity by storing the entire biometric sample in a single device, according to exemplary embodiments of the present invention.

FIG. 3 shows a computerized method for authenticating a person at a physical entity by storing the entire biometric sample in a single device, according to exemplary embodiments of the present invention.

Step 300 discloses a set-up phase of the system. In the set-up phases, the user's device stores a biometric sample and a secret. The biometric sample is pre-captured, for example when registering the person to a system that regulates access to the physical entity. Such registration may be performed when the persons begins working in a new place which requires biometric authentication in order to enter the offices. The worker can access offices according to communication between the worker's mobile electronic device such as a tablet, phone, IoT device for managing access and the like. The set-up may be performed when registering to a service which involves entering a closed area, for example a gym, public transportation, drawing goods from a vending machine and the like.

Step 310 discloses capturing an image of the person and sending image to controller. The image capturing device is located near the physical entity, or embedded therein. The image is captured in response to a request to access the physical entity by the person, for example by pressing a button, or upon detecting a person located near the physical entity. In some other cases, capturing the image may be done periodically, for example in a train station or in a bus.

Step 320 discloses the controller and user's device performing MPC process to determine a match between the captured image and the biometric sample stored in the user's device. The MPC process comprises exchanging information between the user's electronic device and another device, either the controller or the server. During the exchange of information, none of the entities has access or is able to reconstruct the information stored in the other entity. That is, the user's electronic device cannot reconstruct the captured image and the controller or the server cannot reconstruct the biometric sample.

Step 330 discloses the server and user's electronic device performing an authentication process based on a cryptographic method for authentication. The cryptographic method receives as input a secret stored in the user's electronic device. The secret may be inputted into the user's electronic device during the set-up phase 300. The secret may be a private key configured to match a public key stored at the server. The secret may be a symmetric key, a password, a one-time password scheme and the like. In some cases, the secret used as input of the cryptographic method is not entirely stored in the user's electronic device, but is divided into multiple shares. When receives a request to perform the authentication process, the user's electronic device initiates a secret MPC process to reconstruct the secret and sends the secret to the server to perform the authentication process.

Step 340 discloses an optional case in which both the authentication process and the MPC process succeed. In such a case, the controller authenticates the person. In some exemplary cases, the authentication process begins upon a match in the MPC process. In some other cases, both the authentication process and the MPC process are performed simultaneously, to save time. In some cases, after authenticating the person, the controller enables person to access physical entity, as disclosed in step 350. Such access may be enabled by sending a signal from the controller to the physical entity to unlock the physical entity, for example a door or gate, or a computerized device.

Step 345 discloses an optional case in which one of the authentication process and MPC process fails. In such exemplary embodiment, the controller generates and sends alert signal to a remote location. For example, when an unauthorized person requests access to a room, such request may be sent with the person's image, to a predefined address, for example a security personnel's device.

Figure 4:
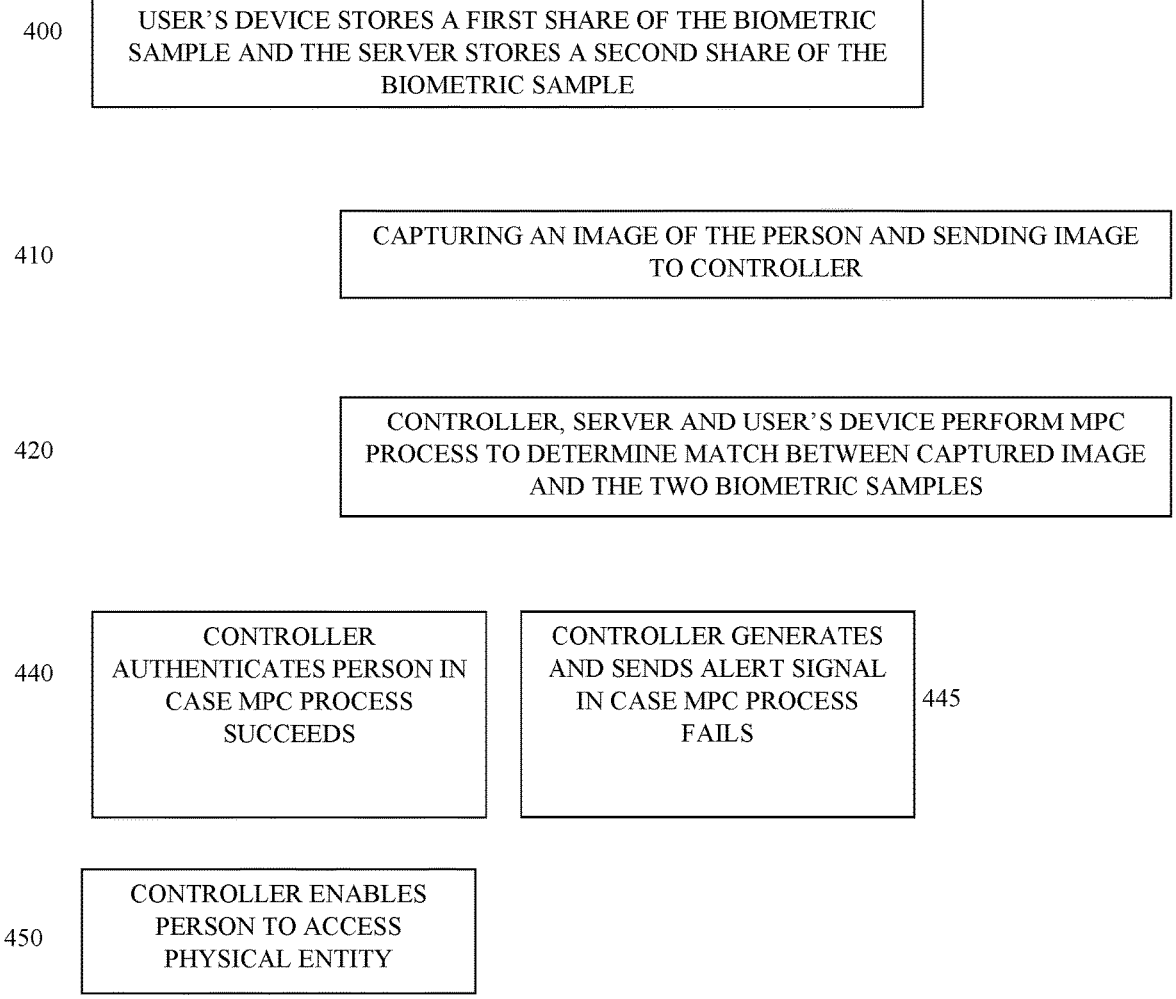
FIG. 4 shows a computerized method for authenticating a person at a physical entity by storing the entire biometric sample in multiple devices, according to exemplary embodiments of the present invention; and, FIG. 5 shows an autonomous vehicle and a person requesting access to enter the vehicle, according to exemplary embodiments of the subject matter.

FIG. 4 shows a computerized method for authenticating a person at a physical entity by storing the entire biometric sample in multiple devices, according to exemplary embodiments of the present invention. The method of FIG. 4 is similar to the method of FIG. 3, only that in the set-up phase of step 400 the biometric sample is split using an MPC process between the user's electronic device and the server. Additionally, storing a secret in the user's electronic device is optional only. Then, in step 410, the person's image is captured. Then, in step 420, an MPC process is performed between the server, the controller and the user's electronic device, as one party holds an image, and the two other parties hold shares of the biometric sample. The result of the MPC process is determination of a match or no match between the image and the shared biometric sample.

Then, step 440 discloses an optional case in which both the authentication process and the MPC process succeed. In such a case, the controller authenticates the person. In some cases, after authenticating the person, the controller enables person to access physical entity, as disclosed in step 450. Step 445 discloses an optional case in which one of the authentication process and MPC process fails. In such exemplary embodiment, the controller generates and sends alert signal to a remote location.

Figure 5:
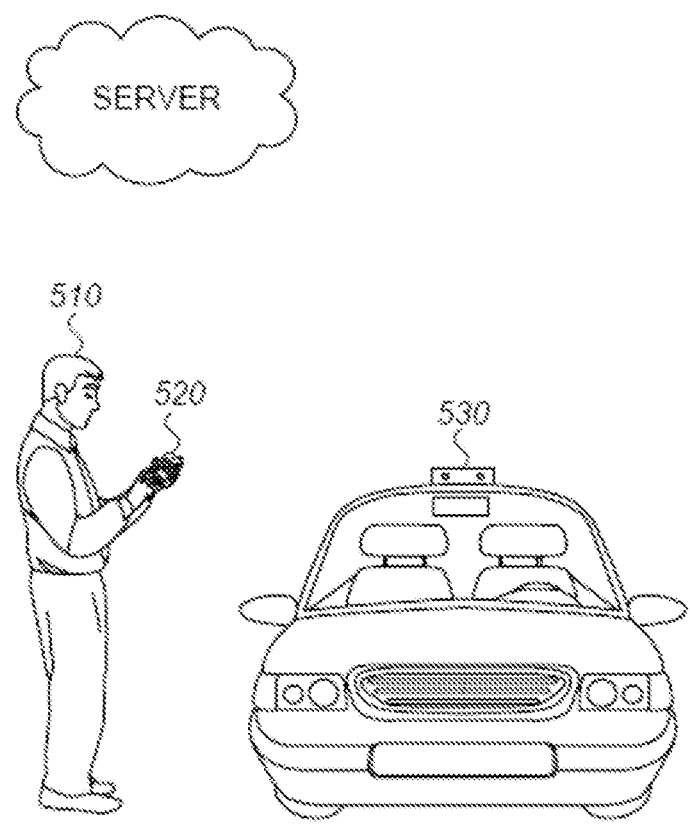

FIG. 5 shows an autonomous vehicle and a person requesting access to enter the vehicle, according to exemplary embodiments of the subject matter. The person 510 carries an electronic device 520 when approaching the vehicle 530. The electronic device 520 comprises the person's entire biometric sample, or a share of the biometric sample, according to the different embodiments disclosed above. The vehicle 530 is an example of the physical entity into which the person 510 is to be authenticated before permitted to access. The vehicle 530 comprises a biometric data acquisition device, for example a camera, scanner and the like, configured to acquire the person's biometric data, for example, image, scan of the person's fingerprint, eyeball and the like. After acquiring the person's biometric data, the controller located at the vehicle 530 communicates with the electronic device 520 and requests a secret to be sent to a computerized server. In some other cases, the controller sends a message to the server with details of the electronic device, the controller requests the server to communicate directly with the electronic device 520. Then, the electronic device 520 exchanges information with the server to verify that a secret stored at the server matches the information stored at the electronic device 520. In some other exemplary embodiments, the electronic device exchanges information using a share of the person's biometric sample with both the server and the controller, to perform a three-party MPC, to verify the person's authenticity.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

What is claimed is:

1. A computerized system for authenticating a person, comprising:
    a controller configured to control access to a physical entity, said controller is connected to a biometric acquisition device configured to acquire biometric data of the person near the physical entity, said controller comprising:

a communication module configured to communicate wirelessly with an electronic device used by the person and an MPC module configured to participate in a multiparty computation (MPC) process with the electronic device used by the person;

a computerized server comprises a biometric data storage configured to store shares of biometric samples associated with multiple devices, a communication module configured to exchange information with at least one of the controller or the electronic device used by the person and an MPC module, said server is configured to provide validation indication of the person;

wherein the electronic device used by the person stores a share of the person's biometric sample, such that the person's biometric sample cannot be extracted solely from the information stored at the electronic device used by the person and cannot be extracted solely from the information stored at the computerized server;

wherein the controller, the electronic device used by the person and the computerized server perform an MPC process to determine a match between the person's biometric data acquired by the biometric acquisition device and the biometric samples stored in at least two shares, one share is stored at a computerized server and another share is stored in the electronic device used by the person;

wherein the controller determines authentication of the person upon determination of the match.

2. A method, comprising:

performing a multi-party computation (MPC') an MPC process between a controller obtaining a biometric data of a person, said biometric data is acquired when the person is located near a physical entity controlled by the controller, said MPC process comprises exchanging information between the controller and an electronic device used by the person to find a match between the acquired biometric data and a biometric sample stored in at least two shares, one share is stored at a computerized server and another share is stored in the electronic device used by the person, wherein the person's biometric sample cannot be extracted solely from the information stored at the electronic device used by the person and cannot be extracted solely from the information stored at the computerized server;

receiving validation information from the computerized server communicating with the controller;

authenticating the person according to the MPC process and the validation information.

3. The method of claim 2, further comprises exchanging information between the server and the electronic device used by the person and comparing the information received from the electronic device used by the person to a secret stored in the server, wherein the validation information comprises confirmation of a match between the information received from the electronic device used by the person and the secret stored in the server.

4. The method of claim 2, further comprises performing a second MPC process between the server and the controller, wherein the server stores at least a portion of the biometric sample, wherein the validation information comprises confirmation of a match of the second MPC process.

5. The method of claim 2, further comprises allowing the person to access the physical entity.

6. The method of claim 2, further generating an alert signal in case authentication failed and transmitting the alert signal to a remote location, said alert signal comprises the captured image.

* * * * *